US012586555B2

(12) United States Patent
Baird et al.

(10) Patent No.: US 12,586,555 B2
(45) Date of Patent: Mar. 24, 2026

(54) HINGING ALIGNMENT TABS IN SEMI-RIGID SUBSTRATE

(71) Applicant: Sabin, LLC, Chicago, IL (US)

(72) Inventors: Lucas Baird, Chicago, IL (US); Samuel Riehl, Chicago, IL (US); Wes Cox, Chicago, IL (US)

(73) Assignee: SABIN, LLC, Chicago, IL (US)

( * ) Notice: Subject to any disclaimer, the term of this patent is extended or adjusted under 35 U.S.C. 154(b) by 181 days.

(21) Appl. No.: 18/320,009

(22) Filed: May 18, 2023

(65) Prior Publication Data

US 2023/0395055 A1 Dec. 7, 2023

Related U.S. Application Data

(60) Provisional application No. 63/343,412, filed on May 18, 2022.

(51) Int. Cl.
*G10K 11/162* (2006.01)

(52) U.S. Cl.
CPC .................................. *G10K 11/162* (2013.01)

(58) Field of Classification Search
CPC .................................................... G10K 11/162
USPC ........................................................ 181/284
See application file for complete search history.

(56) References Cited

U.S. PATENT DOCUMENTS

| | | | | |
|---|---|---|---|---|
| 7,503,429 | B2 * | 3/2009 | Boyce | B60R 13/02 181/290 |
| 9,145,681 | B2 * | 9/2015 | Hannig | E04C 2/388 |
| 10,267,038 | B2 * | 4/2019 | Duschl | E04B 9/0435 |
| 10,837,181 | B2 * | 11/2020 | Josefsson | E04F 13/0894 |
| 10,988,939 | B2 * | 4/2021 | Van Vlassenrode | B32B 5/024 |
| 11,492,810 | B2 * | 11/2022 | Bjorkman | D21J 1/16 |

* cited by examiner

*Primary Examiner* — Forrest M Phillips
(74) *Attorney, Agent, or Firm* — Leydig, Voit & Mayer, Ltd.

(57) ABSTRACT

Embodiments disclosed herein describe an alignment device for providing mechanical alignment between multiple semi-rigid fibrous bodies. The alignment device includes a first semi-rigid fibrous body comprising an alignment tab attached to the first semi-rigid fibrous body through a hinge; and a second semi-rigid fibrous body comprising a mating cavity cut into the second semi-rigid fibrous body, where the alignment tab is located on the first semi-rigid fibrous body and the mating cavity is located on the second semi-rigid fibrous body such that mating the alignment tab with the mating cavity aligns the first semi-rigid fibrous body with the second semi-rigid fibrous body.

6 Claims, 6 Drawing Sheets

HINGING ALIGNMENT TABS IN SEMI-RIGID SUBSTRATE

CROSS-REFERENCE TO RELATED APPLICATIONS

This patent application claims the benefit of U.S. Provisional Patent Application No. 63/343,412, filed May 18, 2022, which is incorporated by reference.

BACKGROUND

Aligning parts in the assembly of a greater composite structure is difficult especially when using semi-rigid fibrous materials. Typically, markings, jigs and tools are relied on to create multi-axes alignment after which the parts are fastened together by tertiary hardware. These additional steps/processes/components add complexity in the form of tolerance stack up, potential human error, availability of tools, etc.

BRIEF DESCRIPTION OF THE SEVERAL VIEWS OF THE DRAWING(S)

Figure 1:
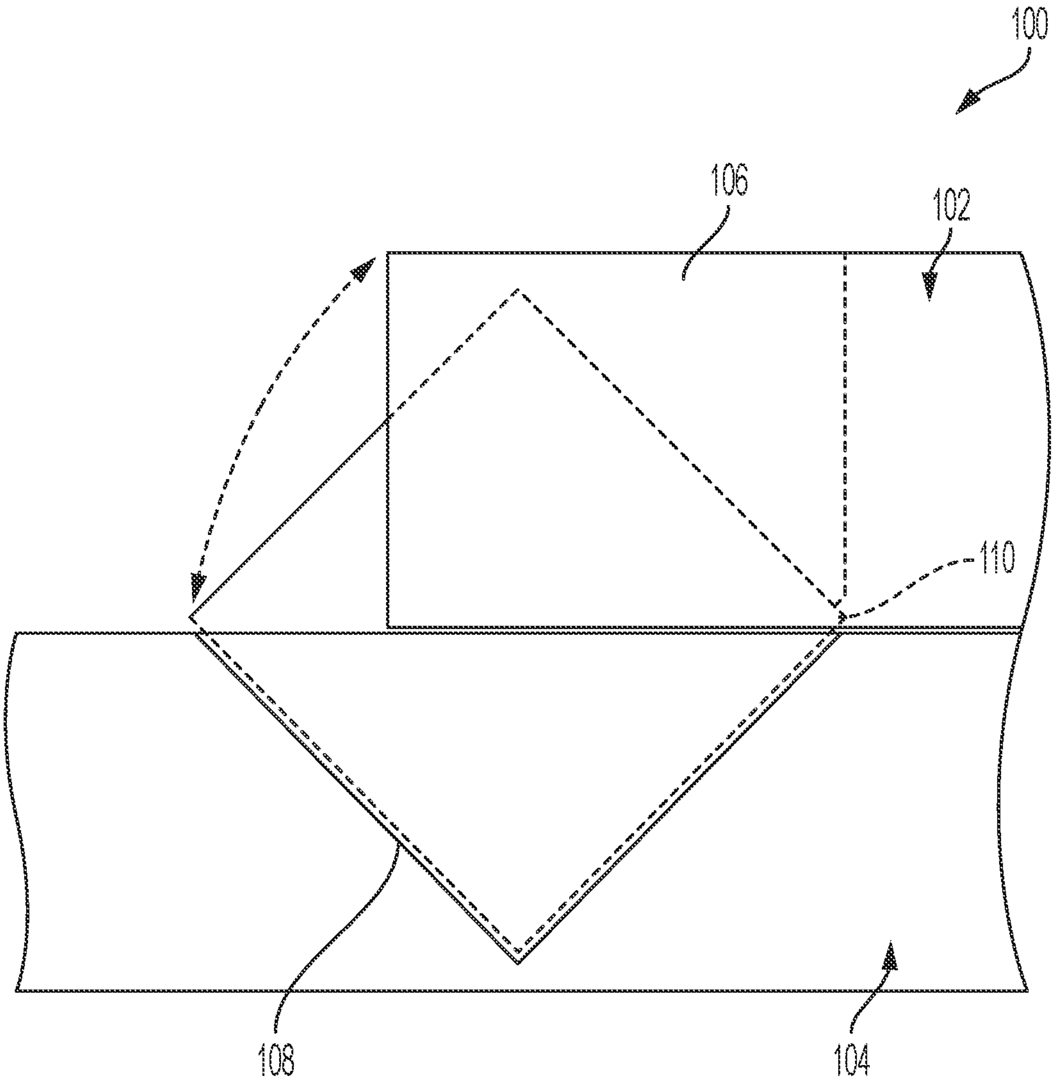
FIG. 1 illustrates an alignment mechanism between two semi-rigid fibrous bodies, in accordance with embodiments of the disclosure.
Figure 2:
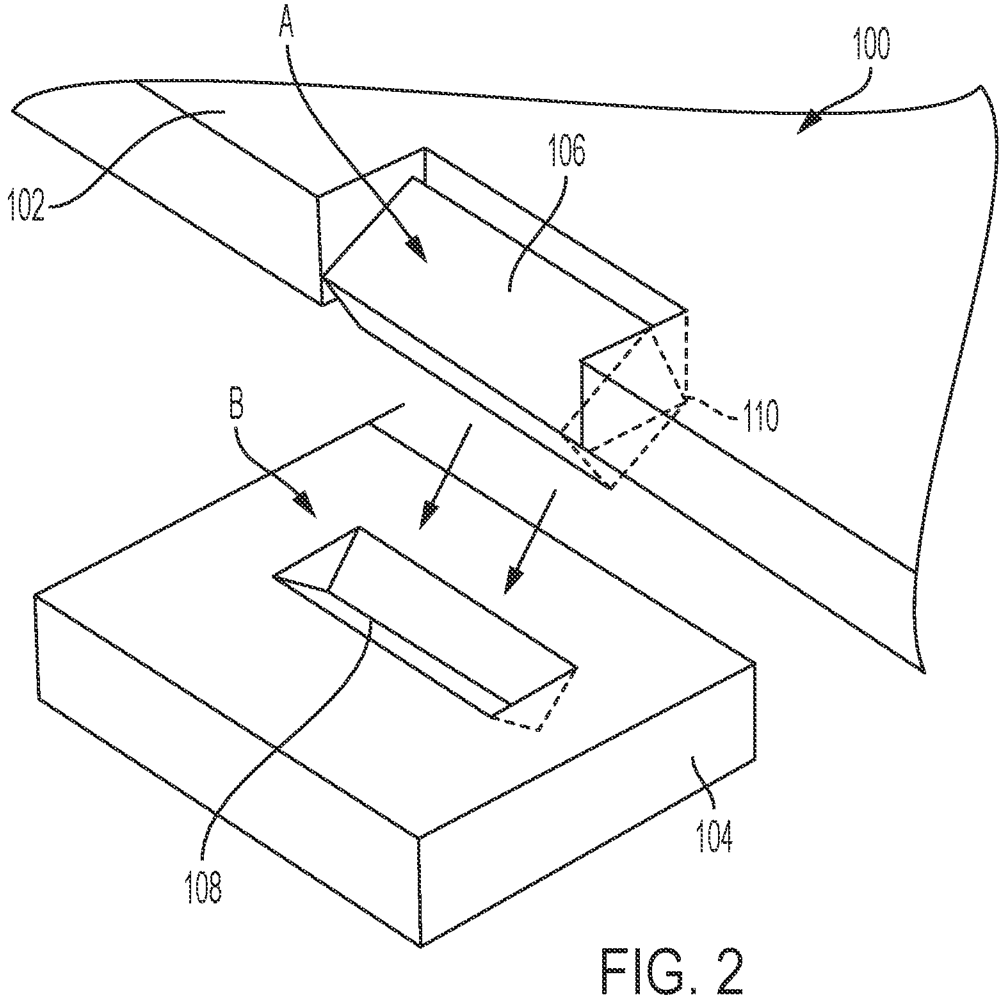
FIG. 2 illustrates an exploded-perspective view of the alignment mechanism of FIG. 1.
Figure 3:
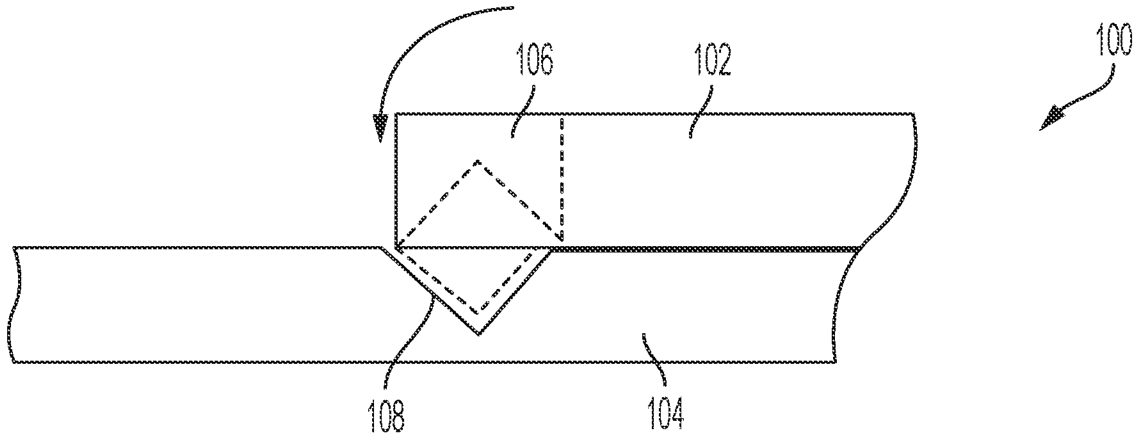
FIG. 3 illustrates a cross-section view of the alignment mechanism of FIGS. 1 and 2.
Figure 4A:
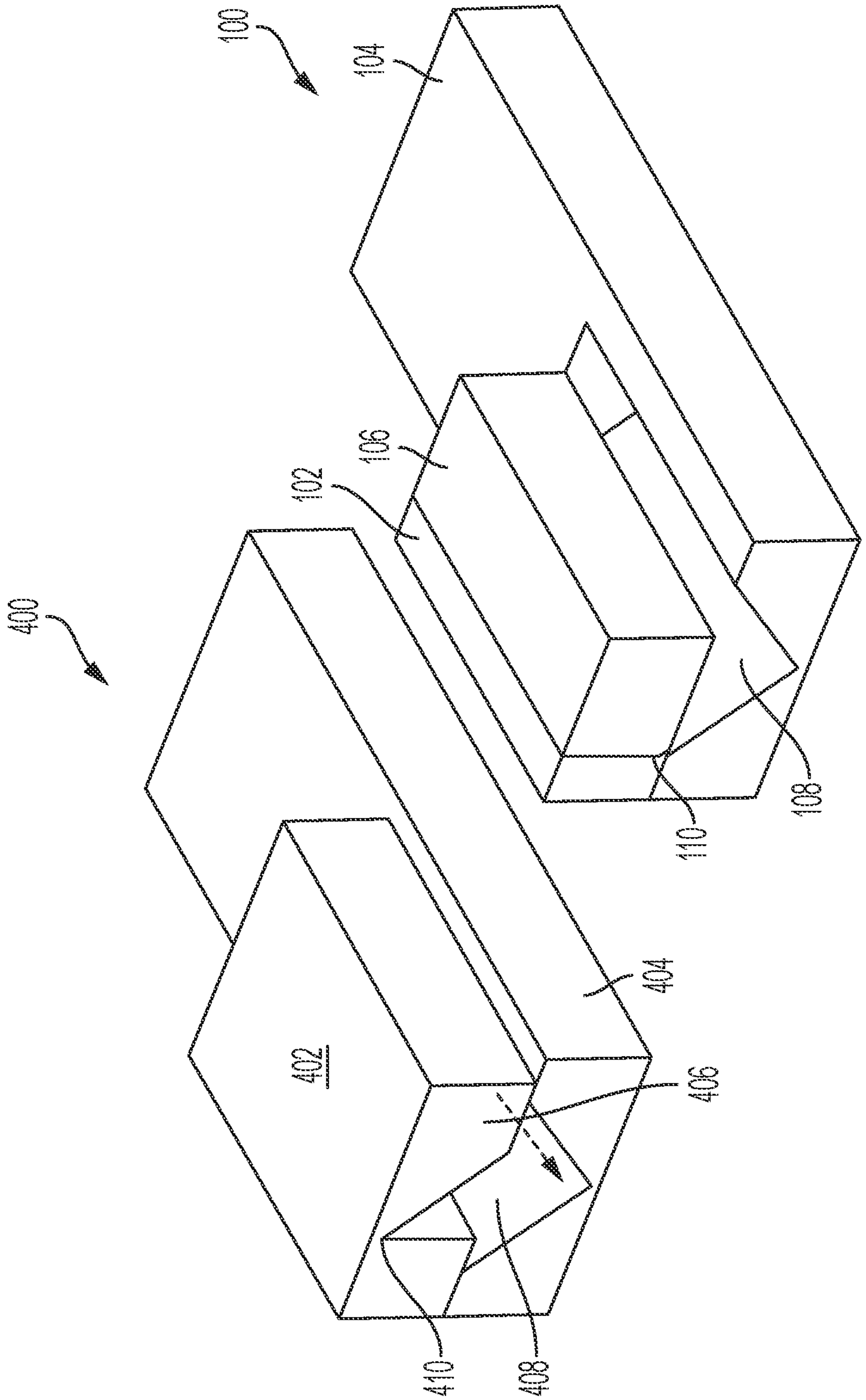
Figure 4B:
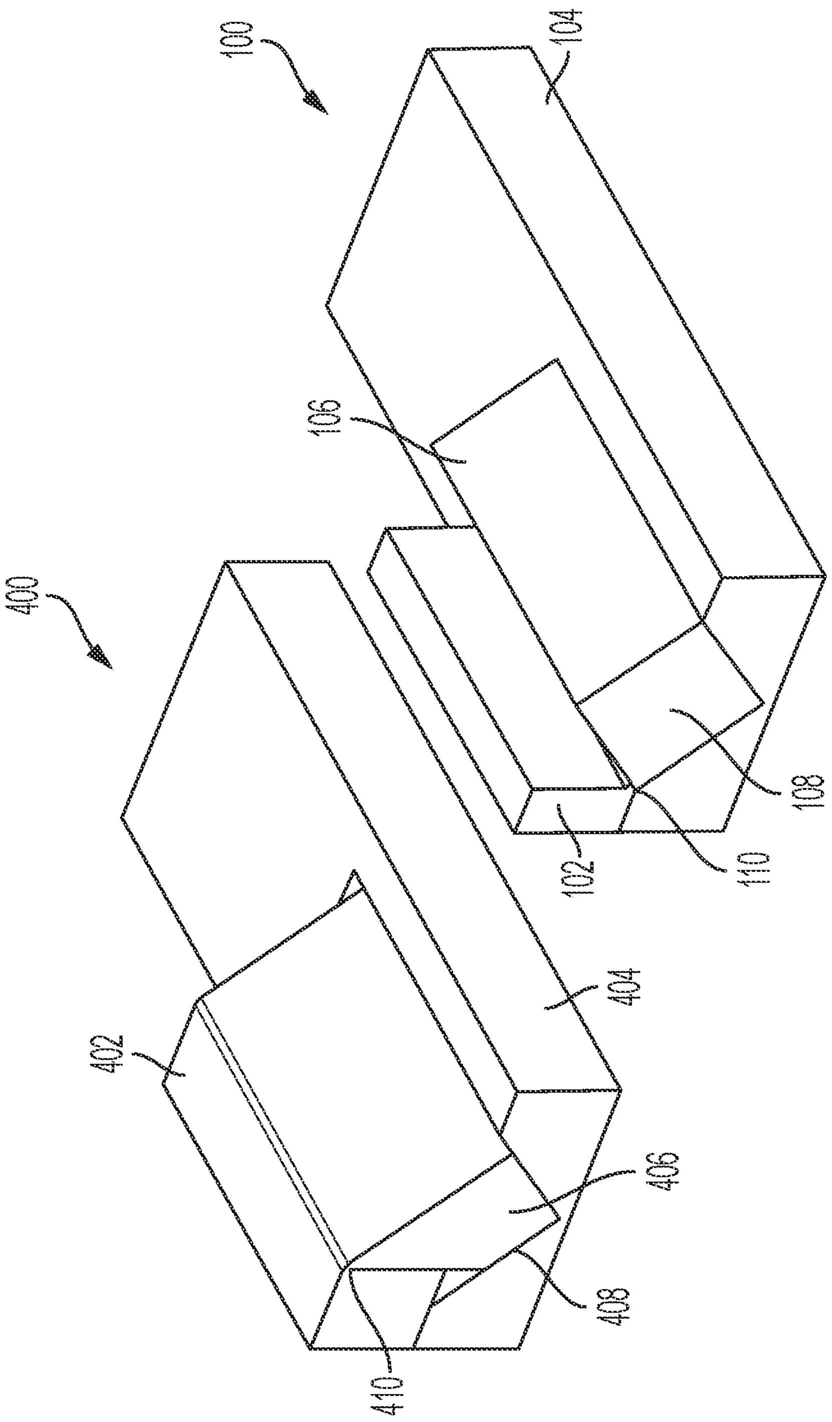
Figure 5A:
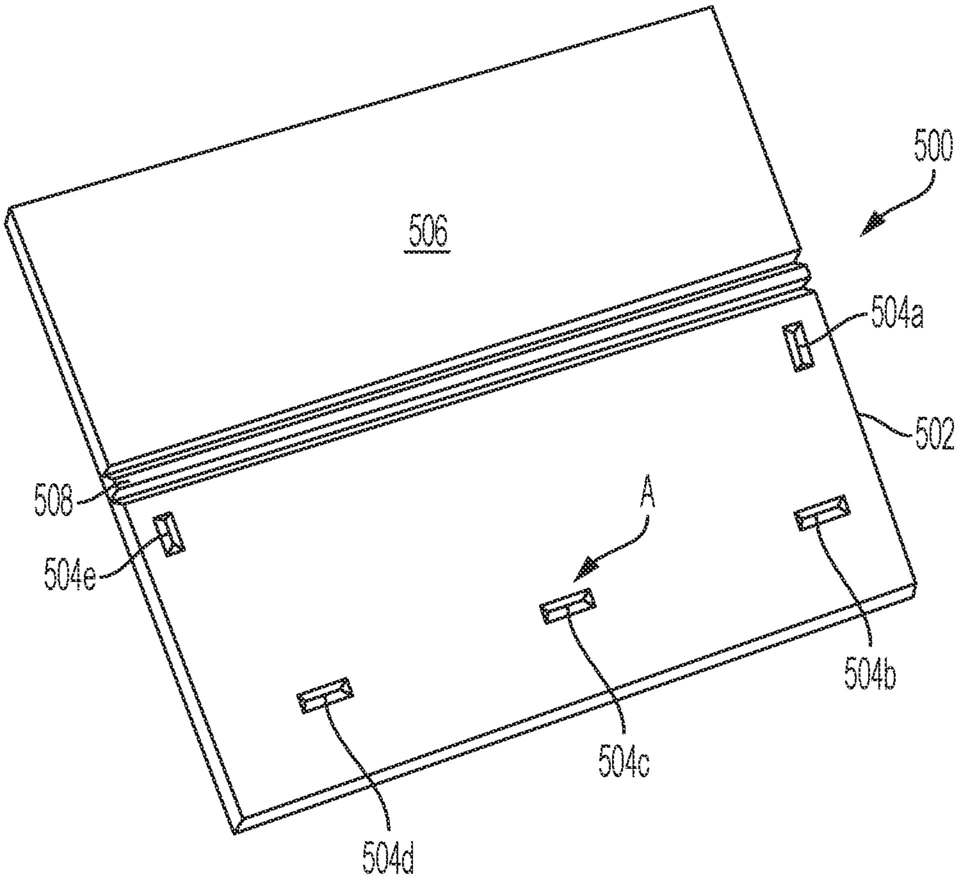
Figure 5B:
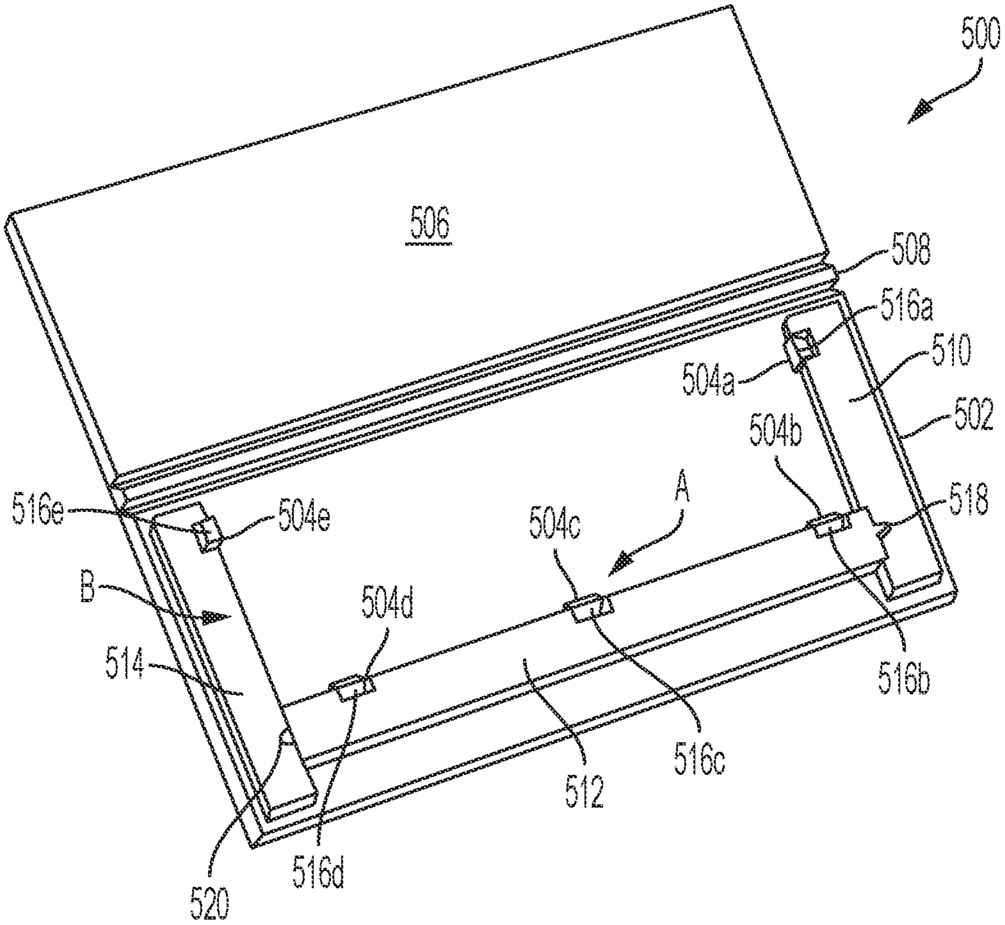

FIGS. 4*a* and 4*b* illustrate a juxtaposition of the alignment mechanism of FIGS. 1-3 with another alignment mechanism, in accordance with embodiments of the disclosure; and FIGS. 5*a* and 5*b* illustrate a perspective view of an alignment between multiple semi-rigid fibrous panels, in accordance with embodiments of the disclosure.

DETAILED DESCRIPTION OF THE INVENTION

Embodiments of the present disclosure provide alignment tabs that drive multi-axes alignment and temporary attachment through cut in hinging tabs that depress from a first semi-rigid fibrous body into a mating cavity located on a second semi-rigid fibrous body. Both of the semi-rigid fibrous bodies are significant to the overall aesthetics and functionality of the end-product they form, which means no additional parts are needed to drive the alignment/attachment between the two bodies. In certain embodiments, the tabs and cavities are created by CNC equipment and are located relative to the overall part and between each body and are cut from the semi-rigid fibrous bodies themselves thereby allowing for near-perfect placement and alignment between the bodies.

FIG. 1 illustrates an alignment mechanism 100 formed from a first semi-rigid fibrous body 102 and a second semi-rigid fibrous body 104. A hinging tab 106 is cut from an end of the first semi-rigid fibrous body 102. The hinging tab 106 is created by performing a partial incision 110 that acts as a living hinge allowing the hinging tab 106 to rotate in the direction of the illustrated arrow into a mating cavity 108 cut from the second semi-rigid fibrous body 104.

As an aside, the hinging tab 106 is illustrated and described as being cut from an end of a panel (i.e., semi-rigid fibrous body 102). However, being cut from an end of the panel is not required. In certain embodiments, the hinging tab 106 may be cut from an interior of the panel and therefore not only relegated to the edges of the panel.

During a placement/alignment process between the first semi-rigid fibrous body 102 and the second semi-rigid fibrous body 104, the hinging tab 106 is mated with the mating cavity 108. This mating causes self-alignment between the first semi-rigid fibrous body 102 and the second semi-rigid fibrous body 104. Further, once the hinging tab 106 and the mating cavity 108 are in the mated condition, additional structural support is provided between the first semi-rigid fibrous body 102 and the second semi-rigid fibrous body 104 via the mating. This secondary benefit of structural support in addition to alignment helps aide in further mechanical processes that may be performed between the first semi-rigid fibrous body 102 and the second semi-rigid fibrous body 104 to complete a final structure made from semi-rigid fibrous materials.

FIG. 2 illustrates an exploded-perspective view of the alignment mechanism 100 formed from the first semi-rigid fibrous body 102 and the second semi-rigid fibrous body 104. The hinging tab 106 is cut from an end of the first semi-rigid fibrous body 102. The hinging tab 106 is created by performing a partial incision 110 that acts as a living hinge allowing the hinging tab 106 to rotate in the direction of the illustrated arrow into a mating cavity 108 cut from the second semi-rigid fibrous body 104.

FIG. 3 illustrates cross-section view of the alignment mechanism 100 formed from the first semi-rigid fibrous body 102 and the second semi-rigid fibrous body 104. The hinging tab 106 is cut from an end of the first semi-rigid fibrous body 102. The hinging tab 106 is created by performing a partial incision 110 that acts as a living hinge allowing the hinging tab 106 to rotate in the direction of the illustrated arrow into a mating cavity 108 cut from the second semi-rigid fibrous body 104.

FIGS. 4*a* and 4*b* illustrate a juxtaposition of perspective view of the alignment mechanism 100 against another embodiment alignment mechanism 400 in both an open state (FIG. 4*a*) and mated state (FIG. 4*b*). The operation of the alignment mechanism 100 is the same as described above. Accordingly, that description will not be repeated here for the sake of brevity. Similar to alignment mechanism 100, alignment mechanism 400 is formed from a first semi-rigid fibrous body 402 and a second semi-rigid fibrous body 404. A hinging tab 406 is cut from an end of the first semi-rigid fibrous body 404. The hinging tab 406 is created by cutting a “V” shaped relief/groove 410 that acts as a living hinge allowing the hinging tab 406 to rotate in the direction of the illustrated arrow into a mating cavity 408 cut from the second semi-rigid fibrous body 404.

FIGS. 5*a* and 5*b* illustrate an exemplary embodiment of a structure using a plurality of alignment mechanisms as illustrated in FIGS. 1-4. FIG. 5*a* illustrates a semi-rigid fibrous panel 500 divided into two sections 502 and 506 separated by a hinge 508. In certain embodiments, hinge 508 is created by two “V” shaped reliefs/grooves separated by a thin ridge such that section 506 can be folded over next to section 502 when the hinge 508 is actuated. Such a structure may be advantageous when construction a baffle product made from semi-rigid fibrous material in order to be used for its ease of use and acoustic dampening properties. In order to maintain a brace between section 502 and section 506 during final construction of the baffle, a bracer structure may be inserted to guarantee a proper spacing and brace between the two sections 502 and 506 in the final product.

In the illustrated embodiment of FIGS. 5*a* and 5*b*, the alignment mechanism of FIGS. 1-4 are used to place and align secondary semi-rigid fibrous bodies 510, 512, and 514 used as braces in FIG. 5*b*. To create this structure, section 502 is cut to create mating cavities 504*a*, 504*b*, 504*c*, 504*d*, and 504*e*. Corresponding hinging tabs 516*a*, 516*b*, 516*c*, 516*d*, and 516*e* are cut into corresponding braces 510, 512, or 514, as shown in FIG. 5*b*. During placement of the braces 510, 512, and 514, the hinging tabs 516*a*, 516*b*, 516*c*, 516*d*, and 516*e* are aligned with the corresponding mating cavities 504*a*, 504*b*, 504*c*, 504*d*, and 504*e*, which guarantees the correct alignment between the section 502 of semi-rigid fibrous panel 500 and the braces 510, 512, and 514. Further, once the hinging tabs 516*a*, 516*b*, 516*c*, 516*d*, and 516*e* are depressed into the corresponding mating cavities 504*a*, 504*b*, 504*c*, 504*d*, and 504*e*, not only is proper alignment between the various bodies achieved but additional support is provided via this mating between tab and cavity to hold the various bodies together such that construction of the baffle product can be completed. In certain embodiments, once alignment is achieved and the added support is provided, section 506 is folded over on top of section 502 and spaced by the braces 510, 512, and 514 and sewn/bonded to section 502 through the braces 510, 512, and 514. In this manner, a solid baffle product is made from semi-rigid fibrous material that has improved acoustic properties.

In the illustrated embodiment, additional alignment and support is provided via tabs 518 and 520. In the illustrated embodiment, tabs are cut from spacer 512 with corresponding grooves in spacers 510 and 514. These tabs/grooves 518 and 520 help to achieve further alignment and support properties between the spacers 510, 512, and 514 themselves.

As used herein, semi-rigid fibrous panel made from sew-able substrates may be any sew-able fibrous body capable of being sewn to another similar such material. For instance, sew-able substrates may include non-woven felts (e.g., architectural acoustic panels and PET), soft plastics/rubbers, foams of varying density whether synthetic or natural, or any other such similar material.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An alignment device for providing mechanical alignment between multiple semi-rigid fibrous bodies, the alignment device comprising:

a first semi-rigid fibrous body comprising an alignment tab attached to the first semi-rigid fibrous body through a hinge; and a second semi-rigid fibrous body comprising a mating cavity cut into the second semi-rigid fibrous body, wherein the alignment tab is located on the first semi-rigid fibrous body and the mating cavity is located on the second semi-rigid fibrous body such that mating the alignment tab with the mating cavity aligns the first semi-rigid fibrous body with the second semi-rigid fibrous body, and wherein the hinge forms a rotatable joint connecting the alignment tab to the first semi-rigid fibrous body and allowing the alignment tab to rotate relative to the first semi-rigid fibrous body.

2. The alignment device of claim 1, wherein the hinge is formed from a partial incision cut in the first semi-rigid fibrous body.

3. The alignment device of claim 1, wherein the hinge is formed from a "V" shaped relief cut into the first semi-rigid fibrous body.

4. An acoustic baffle comprising:

a semi-rigid fibrous panel comprising:

a first section comprising a plurality of mating cavities cut into the first section; and a second section separated from the first section by a panel hinge; and one or more semi-rigid fibrous spacers comprising a plurality of alignment tabs, the plurality of alignment tabs are connected to the one or more semi-rigid fibrous spacers through respective hinges, wherein the plurality of alignment tabs are located on the one or more semi-rigid fibrous spacers in corresponding locations of the plurality of mating cavities of the first section so to align the one or more semi-rigid spacers with the first section when the plurality of alignment tabs are mated with the plurality of mating tabs, wherein each hinge of the respective hinges of the one or more semi-rigid fibrous spacers forms a rotatable joint connecting an individual alignment tab of the plurality of alignment tabs to its respective semi-rigid fibrous spacer of the one or more semi-rigid fibrous spacers, and wherein the rotatable joint allows the individual alignment tab to rotate relative to the respective semi-rigid fibrous spacer.

5. The acoustic baffle of claim 4, wherein the respective hinges are formed from a partial incision cut in the one or more semi-rigid fibrous spacers.

6. The acoustic baffle of claim 4, wherein the respective hinges are formed from a "V" shaped relief cut into the one or more semi-rigid fibrous spacers.

* * * * *